US007685408B2

(12) United States Patent
Wolff et al.

(10) Patent No.: US 7,685,408 B2
(45) Date of Patent: Mar. 23, 2010

(54) METHODS AND APPARATUS FOR EXTRACTING BITS OF A SOURCE REGISTER BASED ON A MASK AND RIGHT JUSTIFYING THE BITS INTO A TARGET REGISTER

(75) Inventors: Edward A. Wolff, Chapel Hill, NC (US); Peter R. Molnar, Chapel Hill, NC (US); Ayman Elezabi, Cairo (EG); Gerald George Pechanek, Cary, NC (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 12/239,920

(22) Filed: Sep. 29, 2008

(65) Prior Publication Data

US 2009/0019269 A1    Jan. 15, 2009

Related U.S. Application Data

(63) Continuation of application No. 10/282,919, filed on Oct. 29, 2002, now abandoned.

(60) Provisional application No. 60/335,159, filed on Nov. 1, 2001.

(51) Int. Cl.
*G06F 7/38* (2006.01)
*G06F 7/00* (2006.01)

(52) U.S. Cl. .................. 712/224; 712/300

(58) Field of Classification Search .......... 712/224; 708/209, 210, 211
See application file for complete search history.

(56) References Cited

U.S. PATENT DOCUMENTS

| 4,085,447 | A  | * | 4/1978 | Pertl et al. ............... | 712/224 |
| 5,729,482 | A  | * | 3/1998 | Worrell ................... | 708/209 |
| 6,243,808 | B1 | * | 6/2001 | Wang ...................... | 712/300 |
| 6,622,242 | B1 | * | 9/2003 | Steele, Jr. ................ | 712/300 |
| 6,715,066 | B1 | * | 3/2004 | Steele, Jr. ................ | 712/300 |
| 6,718,492 | B1 | * | 4/2004 | Shavit et al. .............. | 714/701 |
| 2002/0002666 | A1 | * | 1/2002 | Dulong et al. ........... | 712/224 |
| 2002/0108030 | A1 | * | 8/2002 | Lee et al. ................. | 712/300 |

OTHER PUBLICATIONS

Hillis, W. Daniel, Steele Jr., Guy L. "Data Parallel Algorithms" Communications of the ACM, Dec. 1986, vol. 29 No. 12, pp. 1170-1183.*
Aspnes, James, Herlihy, Maurice, Shavit, Nir. "Counting Networks" Journal of the Association for Computing Machinery, Sep. 1994, vol. 41 No. 5, pp. 1020-1048.*

* cited by examiner

*Primary Examiner*—Eddie P Chan
*Assistant Examiner*—Jacob Petranek
(74) *Attorney, Agent, or Firm*—Priest & Goldstein, PLLC

(57) ABSTRACT

Techniques for performing a bit rake instruction in a programmable processor. The bit rake instruction extracts an arbitrary pattern of bits from a source register, based on a mask provided in another register, and packs and right justifies the bits into a target register. The bit rake instruction allows any set of bits from the source register to be packed together.

20 Claims, 11 Drawing Sheets

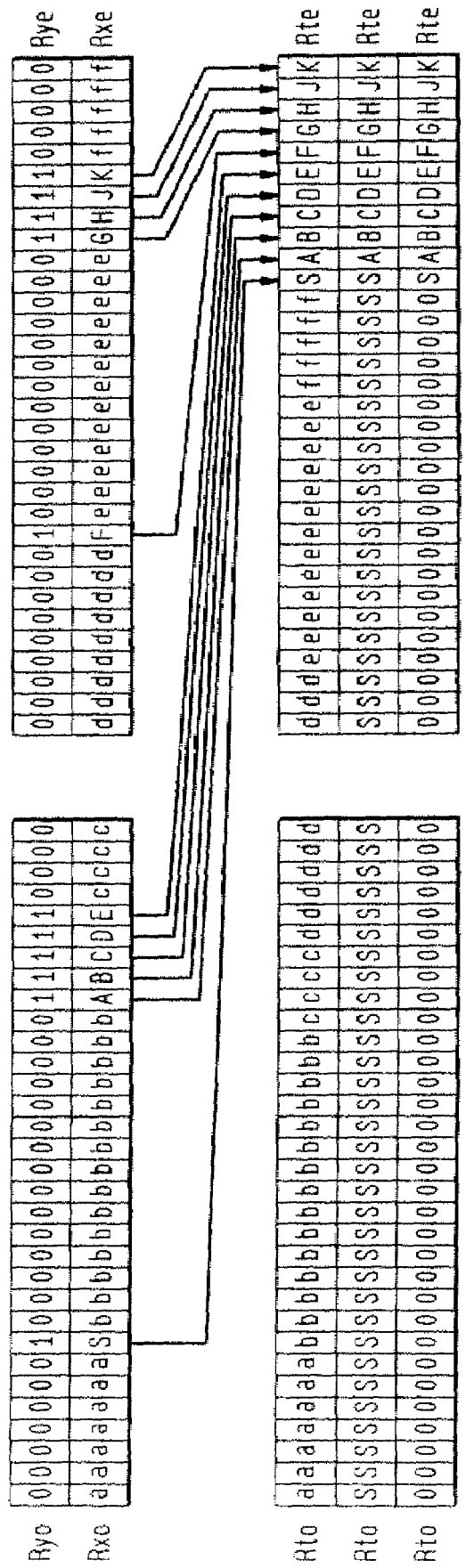

FIG. 2C

SYNTAX/OPERATION ← 250

| INSTRUCTION | OPERANDS | OPERATION | ACF |
|---|---|---|---|
| | | | DOUBLEWORD |
| BITRAKE.[SP][AM].1D.U | Rte,Rxe,Rye | Rto\|\|Rte ← ALL BITS FROM Rxo\|\|Rxe CORRESPONDING TO BIT POSITIONS IN Ryo\|\|Rye WITH 1's, PACKED AND RIGHT JUSTIFIED. ALL OTHER Rxo\|\|Rxe BITS PACKED AND LEFT JUSTIFIED. | NONE |
| BITRAKE.[SP][AM].1D.X | Rte,Rxe,Rye | Rto\|\|Rte ← ALL BITS FROM Rxo\|\|Rxe CORRESPONDING TO BIT POSITIONS IN Ryo\|\|Rye WITH 1's, PACKED AND RIGHT JUSTIFIED. ALL OTHER BITS SET TO MSB OF THE EXTRACTED FIELD. | NONE |
| BITRAKE.[SP][AM].1D.Z | Rte,Rxe,Rye | Rto\|\|Rte ← ALL BITS FROM Rxo\|\|Rxe CORRESPONDING TO BIT POSITIONS IN Ryo\|\|Rye WITH 1's, PACKED AND RIGHT JUSTIFIED. ALL OTHER BITS SET TO '0'. | NONE |
| [TF].BITRAKE.[SP][AM].1D.[UXZ] | Rte,Rxe,Rye | Do operation only if T/F condition is satisfied in ACF's | NONE |
| | | | WORD |
| BITRAKE.[SP][AM].1W.U | Rt,Rx,Ry | Rt ← ALL BITS FROM Rx CORRESPONDING TO BIT POSITIONS IN Ry WITH 1's, PACKED AND RIGHT JUSTIFIED. ALL OTHER Rx BITS PACKED AND LEFT JUSTIFIED. | NONE |
| BITRAKE.[SP][AM].1W.X | Rt,Rx,Ry | Rt ← ALL BITS FROM Rx CORRESPONDING TO BIT POSITIONS IN Ry WITH 1's, PACKED AND RIGHT JUSTIFIED. ALL OTHER BITS SET TO MSB OF THE EXTRACTED FIELD. | NONE |
| BITRAKE.[SP][AM].1W.Z | Rt,Rx,Ry | Rt ← ALL BITS FROM Rx CORRESPONDING TO BIT POSITIONS IN Ry WITH 1's, PACKED AND RIGHT JUSTIFIED. ALL OTHER BITS SET TO '0'. | NONE |
| [TF].BITRAKE.[SP][AM].1W.[UXZ] | Rt,Rx,Ry | Do operation only if T/F condition is satisfied in ACF's | NONE |

ARITHMETIC SCALAR FLAGS AFFECTED (ON LEAST SIGNIFICANT OPERATION)
C=NOT AFFECTED   N=MSB OF RESULT   V=NOT AFFECTED   Z=1 IF RESULT IS ZERO, 0 OTHERWISE
SEE ALSO ASF DEFINITIONS IN CHAPTER ON CONDITIONAL EXECUTION

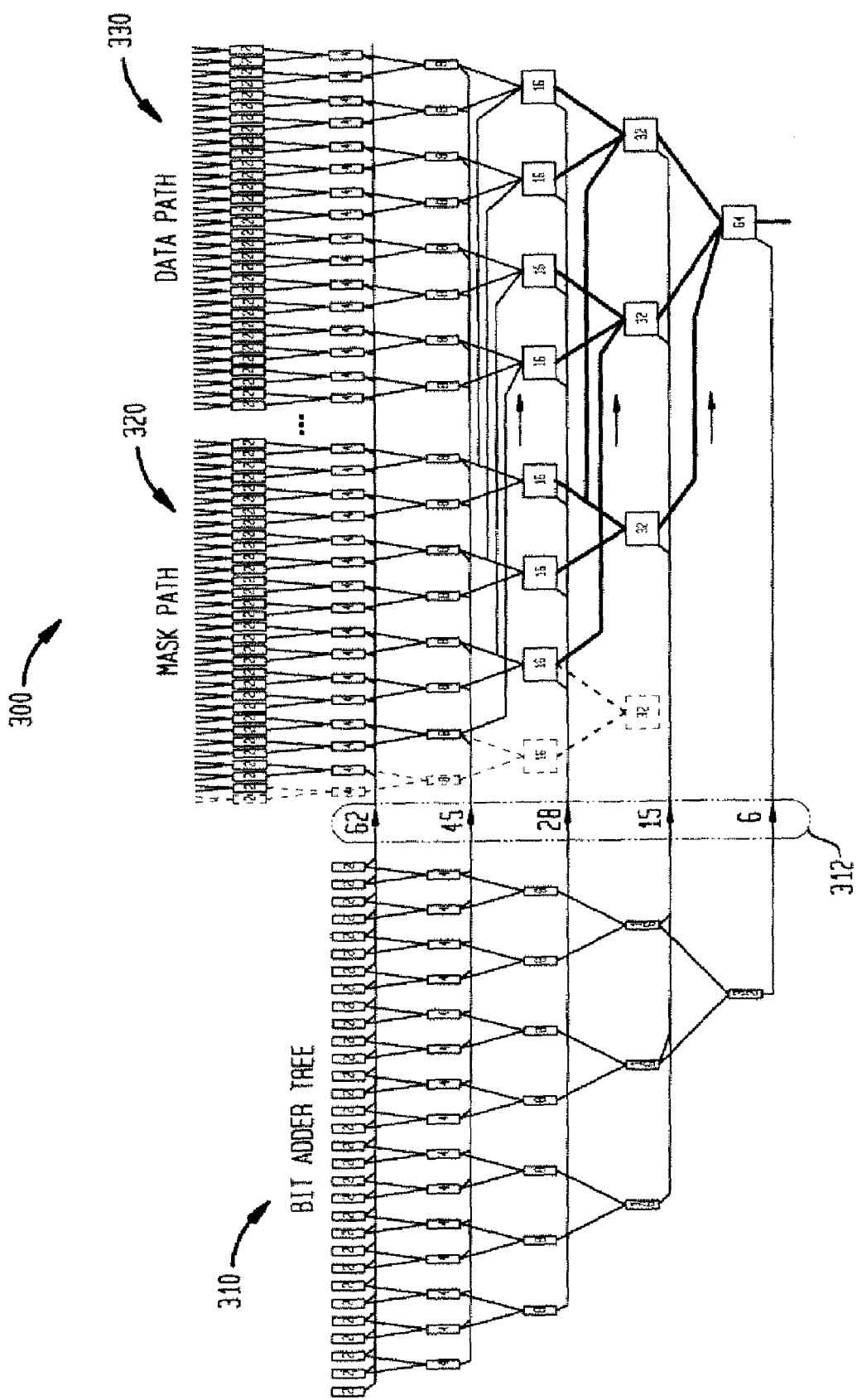

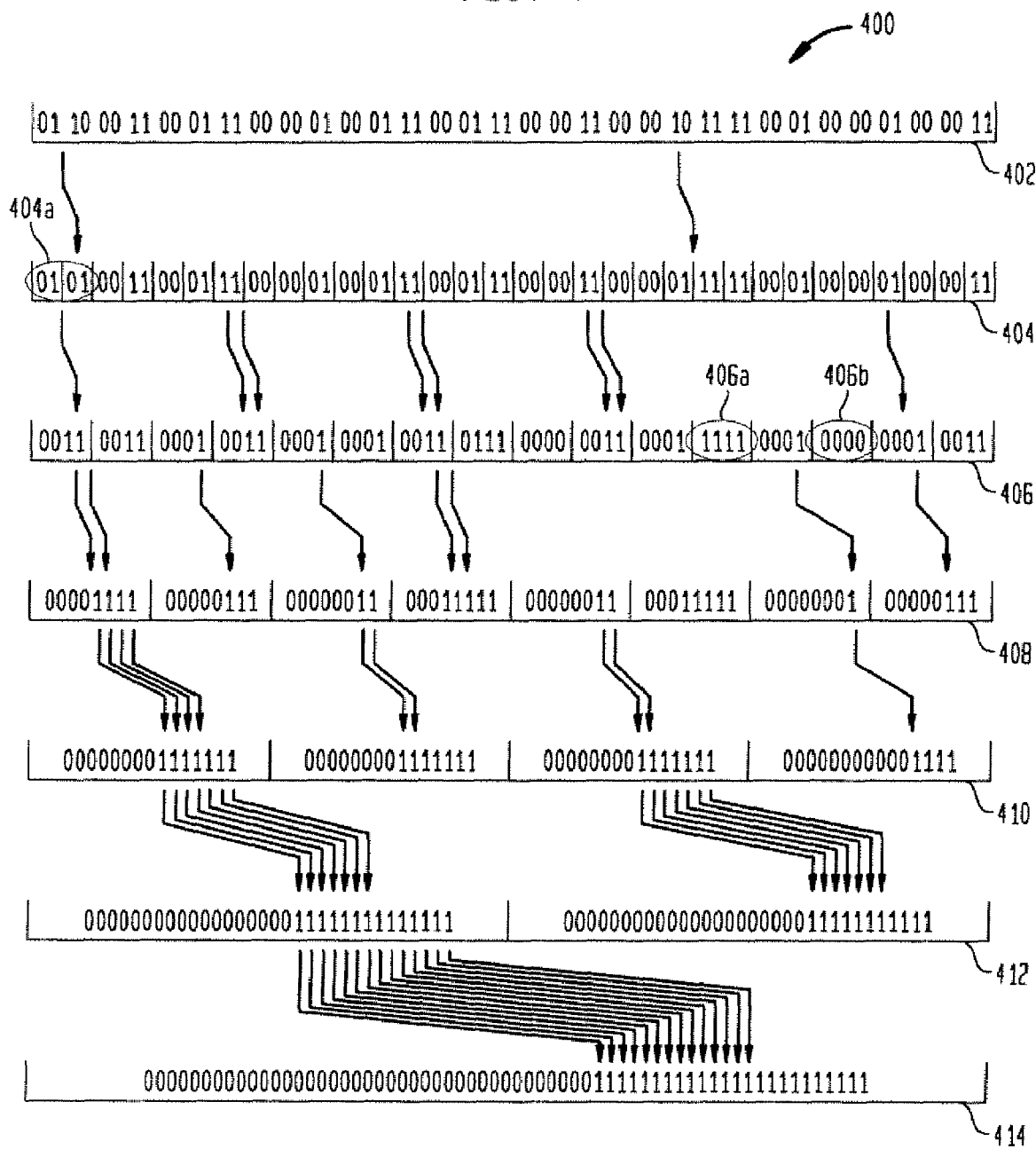

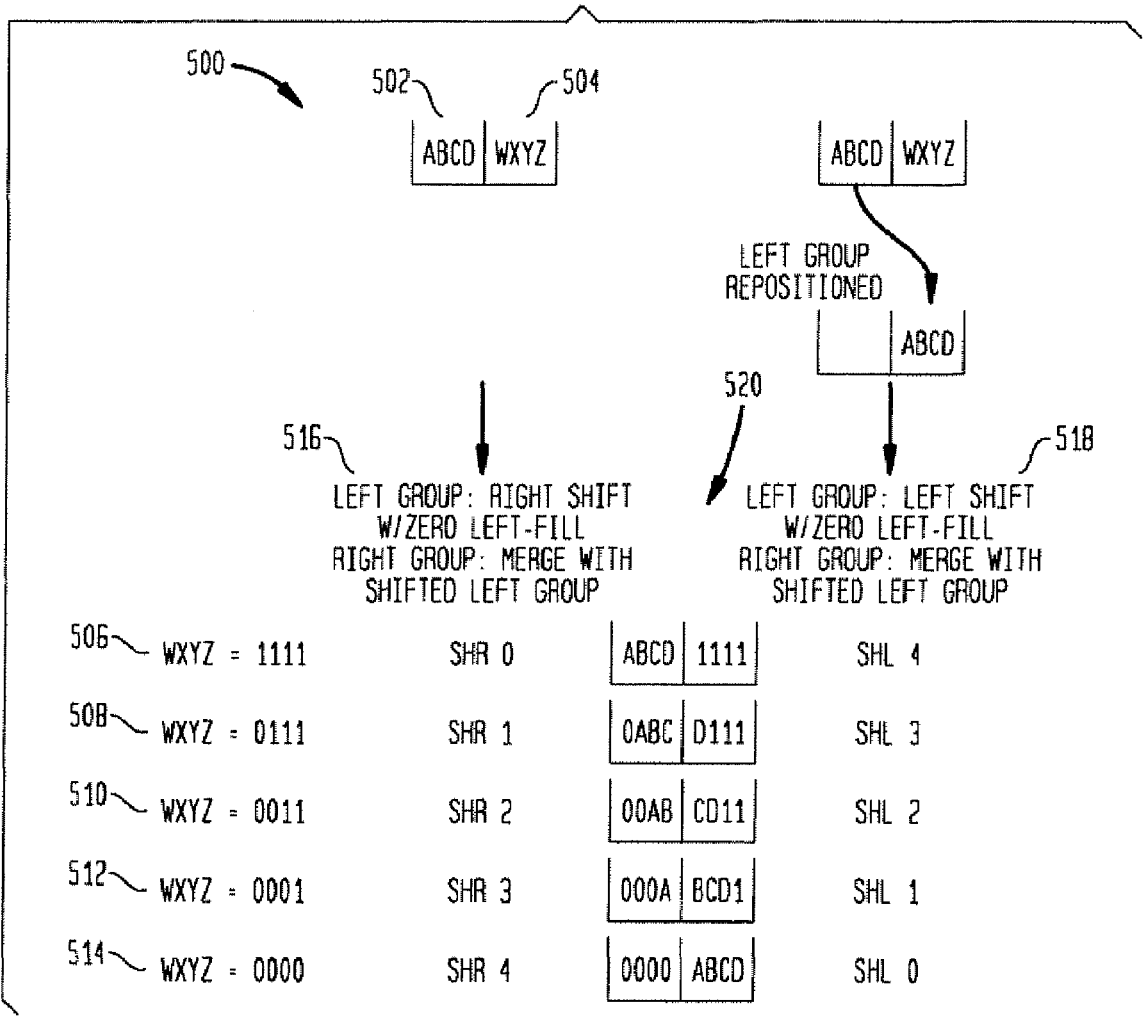
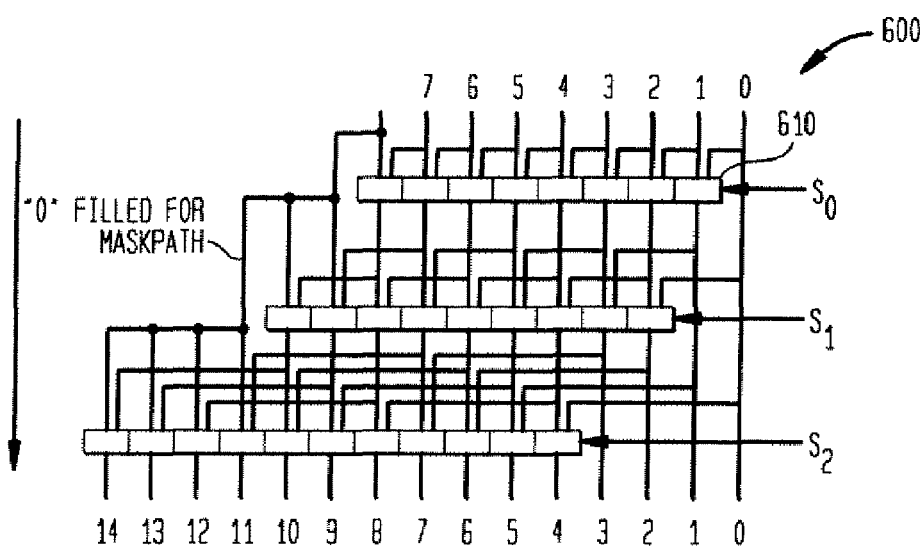

S5 BINARY SHIFTER
(5 MUX LEVELS e.g.)
M1 MULTIPLEXER
(1 MUX LEVELS)
C32 BIT COUNT
(ALL 32 BITS e.g.)

US 7,685,408 B2

METHODS AND APPARATUS FOR EXTRACTING BITS OF A SOURCE REGISTER BASED ON A MASK AND RIGHT JUSTIFYING THE BITS INTO A TARGET REGISTER

FIELD OF THE INVENTION

The present invention relates generally to improvements in computational processing. More specifically, the present invention relates to a system and method for providing a bit rake instruction to extract a pattern of hits from a source register.

BACKGROUND OF THE INVENTION

In many communications-related standards a need exists for an instruction that allows getting or putting several bits from or to a register without having to operate on one hit at a time through a series of bit load or bit store instructions. For example, in ADSL QAM encoding every other bit from a bit stream is packed together to create a two's complement integer. When performing puncturing in convolutional encoding, some of the encoder's output bits are omitted before transmission. In one puncturing technique, every fourth bit is removed. In another case, bits 3, 4, 9, 10, 15, 16 and the like are removed. When performing bit-wise interleaving, a bit stream is shuffled to increase protection against bursts of errors. One mapping used in 802.11a requires that the reordered bit stream contains bits 1, 21, 38, 55, 75, 92 and the like of the original bit stream.

SUMMARY OF THE INVENTION

The present invention provides a programmable system and method for performing a bit rake instruction which extracts an arbitrary pattern of bits from a source register, based on a mask provided in another register, and packs and right justifies the bits into a target register. The bit rake instruction allows any set of bits from the source register to be packed together.

A more complete understanding of the present invention, as well as further features and advantages of the invention, will be apparent from the following detailed description and the accompanying drawings.

BRIEF DESCRIPTION OF THE DRAWINGS

FIG. 2A shows an exemplary encoding of a bit rake instruction in accordance with the present invention;

FIG. 2B shows an exemplary operation of a bit rake instruction in accordance with the present invention;

FIG. 2C shows syntax and operation of a bit rake instruction in accordance with the present invention;

FIGS. 3A and 3B show diagrams of a bit rake apparatus in accordance with the present invention;

FIG. 4 shows the sorting of groups of asserted mask bits in accordance with the present invention;

FIG. 5 shows a right-shift to left-shift example in accordance with the present invention;

FIG. 6 shows a 3-level shifter in accordance with the present invention;

DETAILED DESCRIPTION

Figure 1:
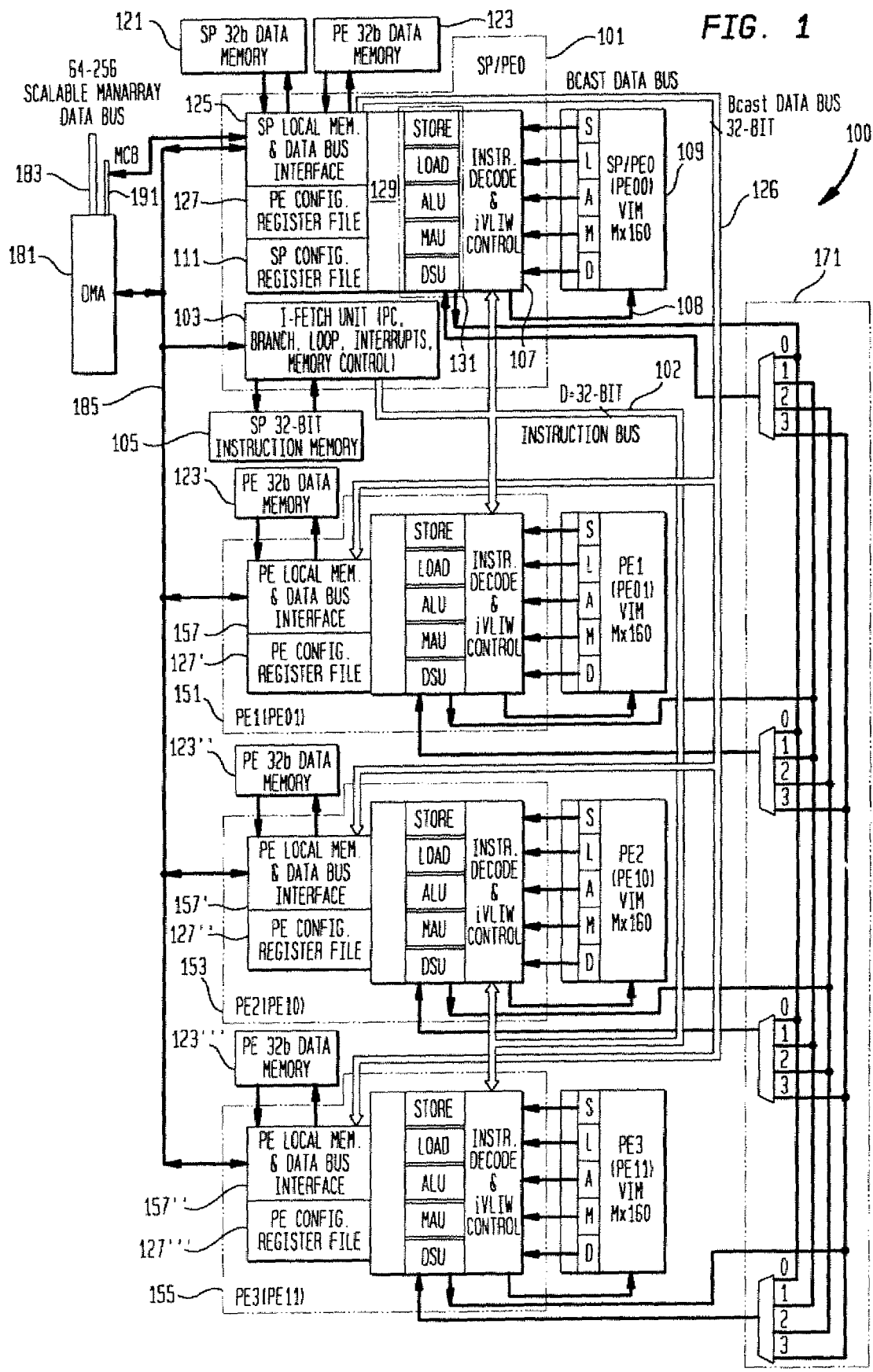
FIG. 1 illustrates an exemplary ManArray DSP and DMA subsystem appropriate for use with this invention.

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,256 filed Oct. 9, 1998, now U.S. Pat. No. 6,167,501, U.S. patent application Ser. No. 09/169,072 filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,558 filed Dec. 4, 1998, now U.S. Pat. No. 6,173,389, U.S. patent application Ser. No. 09/215,081 flied Dec. 18, 1998, now U.S. Pat. No. 6,101,592, U.S. patent application Ser. No. 09/228,374 filed Jan. 12, 1999, now U.S. Pat. No. 6,216,223, U.S. patent application Ser. No. 09/471,217 filed Dec. 23, 1999, now U.S. Pat. No. 6,260,082, U.S. patent application Ser. No. 09/472,372 filed Dec. 23, 1999, now U.S. Pat. No. 6,256,683, U.S. patent application Ser. No. 09/238,446 filed Jan. 28, 1999, now U.S. Pat. No. 6,366,999, U.S. patent application Ser. No. 09/267,570 filed Mar. 12, 1999, now U.S. Pat. No. 6,446,190, U.S. patent application Ser. No. 09/337,839 filed Jun. 22, 1999, now U.S. Pat. No. 6,839,728, U.S. patent application Ser. No. 09/350,191 filed Jul. 9, 1999, now U.S. Pat. No. 6,356,994, U.S. patent application Ser. No. 09/422,015 filed Oct. 21, 1999, now U.S. Pat. No. 6,408,382, U.S. patent application Ser. No. 09/432,705 filed Nov. 2, 1999, now U.S. Pat. No. 6,697,427, U.S. patent application Ser. No. 09/596,103 filed Jun. 16, 2000, now U.S. Pat. No. 6,397,324, U.S. patent application Ser. No. 09/598,567 filed Jun. 21, 2000, now U.S. Pat. No. 6,826,522, U.S. patent application Ser. No. 09/598,564 filed Jun. 21, 2000, now U.S. Pat. No. 6,622,234, U.S. patent application Ser. No. 09/598,566 filed Jun. 21, 2000, now U.S. Pat. No. 6,735,690, U.S. patent application Ser. No. 09/598,558 filed Jun. 21, 2000, now U.S. Pat. No. 6,868,490, U.S. patent application Ser. No. 09/598,084 filed Jun. 21, 2000, now U.S. Pat. No. 6,654,870, U.S. patent application Ser. No. 09/599,980 filed Jun. 22, 2000, now U.S. Pat. No. 6,748,517, U.S. patent application Ser. No. 09/711,218 filed Nov. 9, 2000, now U.S. Pat. No. 6,754,687, U.S. patent application Ser. No. 09/747,056 filed Dec. 12, 2000, now U.S. Pat. No. 6,704,857, U.S. patent application Ser. No. 09/853,989 filed May 11, 2001, now U.S. Pat. No. 6,845,445, U.S. patent application Ser. No. 09/886,855 filed Jun. 21, 2001, now U.S. Pat. No. 7,181,730, U.S. patent application Ser. No. 09/791,940 filed Feb. 23, 2001, now U.S. Pat. No. 6,834,295, U.S. patent application Ser. No. 09/792,819 filed Feb. 23, 2001, now U.S. Pat. No. 6,865,663, U.S. patent application Ser. No. 09/791,256 filed Feb. 23, 2001, now U.S. Pat. No. 6,842,811, U.S. patent application Ser. No. 10/013,908 filed Oct. 19, 2001, now U.S. Pat. No. 7,003,450, Provisional Application Ser. No. 60/251,072 filed Dec. 4, 2000, Provisional Application Ser. No. 60/281,523 filed Apr. 4, 2001, Provisional Application Ser. No. 60/283,582 filed Apr. 13, 2001, Provisional Application Ser. No. 60/287,270 filed Apr. 27, 2001, Provisional Application Ser. No. 60/288,965 filed May 4, 2001, Provisional Application Ser. No. 60/298,624 filed Jun. 15, 2001, Provisional Application Ser. No. 60/298,695 filed Jun. 15, 2001, Provisional Application Ser. No. 60/298,696 filed Jun. 15, 2001, Provisional Application Ser. No. 60/318,745 filed Sep. 11, 2001, Provisional Application Ser. No. 60/340,620 filed Oct. 30, 2001 all of which are assigned to the assignee of the present invention and incorporated by reference herein in their entirety.

In a presently preferred embodiment of the present invention, a ManArray 2×2 iVLIW single instruction multiple data stream (SIMD) processor 100 as shown in FIG. 1 may be adapted as described further below for use in conjunction with the present invention. Processor 100 comprises a sequence processor (SP) controller combined with a processing element-0 (PE0) to form an SP/PE0 combined unit 101, as described in further detail in U.S. patent application Ser. No. 09/169,072 entitled "Methods and Apparatus for Dynamically Merging an Array Controller with an Array Processing Element". Three additional PEs 151, 153, and 155 are also labeled with their matrix positions as shown in parentheses for PE0 (PE00) 101, PE1 (PE01) 151, PE2 (PE10) 153, and PE3 (PE11) 155. The SP/PE0 101 contains an instruction fetch (I-fetch) controller 103 to allow the fetching of "short" instruction words (SIW) or abbreviated-instruction words from a B-bit instruction memory 105, where B is determined by the application instruction-abbreviation process to be a reduced number of bits representing ManArray native instructions and/or to contain two or more abbreviated instructions as described in the present invention. If an instruction abbreviation apparatus is not used then B is determined by the SIW format. The fetch controller 103 provides the typical functions needed in a programmable processor, such as a program counter (PC), a branch capability, event-point loop operations (see U.S. Provisional Application Ser. No. 60/140,245 entitled "Methods and Apparatus for Generalized Event Detection and Action Specification in a Processor" filed Jun. 21, 1999 for further details), and support for interrupts. It also provides the instruction memory control which could include an instruction cache if needed by an application. In addition, the I-fetch controller 103 controls the dispatch of instruction words and instruction control information to the other PEs in the system by means of a D-bit instruction bus 102. D is determined by the implementation, which for the exemplary ManArray coprocessor D=32-bits. The instruction bus 102 may include additional control signals as needed in an abbreviated-instruction translation apparatus.

In this exemplary system 100, common elements are used throughout to simplify the explanation, though actual implementations are not limited to this restriction. For example, the execution units 131 in the combined SP/PE0 101 can be separated into a set of execution units optimized for the control function; for example, fixed point execution units in the SP, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW instruction memory (VIM) 109 and an instruction decode and VIM controller functional unit 107 which receives instructions as dispatched from the SP/PE0's I-fetch unit 103 and generates VIM addresses and control signals 108 required to access the iVLIWs stored in the VIM. Referenced instruction types are identified by the letters SLAMD in VIM 109, where the letters are matched up with instruction types as follows: Store (S), Load (L), ALU (A), MAU (M), and DSU (D).

The basic concept of loading the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Method and Apparatus for Dynamic Instruction Controlled Reconfiguration Register File with Extended Precision". Due to the combined nature of the SP/PE0, the data memory interface controller 125 must handle the data processing needs of both the SP controller, with SF data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. patent application Ser. No. 08/885,310 entitled "Manifold Array Processor", now U.S. Pat. No. 6,023,753, and U.S. patent application Ser. No. 09/169,256 entitled "Methods and Apparatus for Manifold Array Processing", and U.S. patent application Ser. No. 09/169,256 entitled "Methods and Apparatus for ManArray PE-to-PE Switch Control". The interface to a host processor, other peripheral devices, and/or external memory can be done in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1.

As seen in instruction format 200 of FIG. 2A, a bit rake instruction operating as shown in diagram 220 of FIG. 2B copies all bits, determined by a mask register, such as Rye, from a source register, such as Rxe, and packs the bits into the least significant bit (LSB) positions of a target register, such as Rte. FIG. 2C shows a block diagram 250 of exemplary syntax and operation of a bit rake instruction in accordance with the present invention. For the doubleword .1D version 255, the high order bits of Rte may be set to zero (.Z), to the most significant bit (MSB) of the extracted field (.X), or to the un-extracted (unmasked) Rxe bits (.U). Rye contains '1's in the bit positions that are copied from Rxe to the LSB positions of Rte. Rye contains '0's at the bit positions that are either copied from Rxe to the MSB positions of Rte, or are ignored. Thus, in a preferred embodiment, Rxe, Rye and Rte are the same size. The syntax and operation of the word 0.1W version 260 of a bit rake instruction is also shown in FIG. 2C.

As seen in the example shown in FIG. 2B, the lower case letters (a-f) represent unmasked source bit regions and the upper case letters (S, A-K) represent the masked source bits. S & A-K are merged toward the right, and either the unmasked source bit-regions (a-f) are merged toward the left, or zero or the most significant extracted bit (S), is extended toward the left. Utilizing the syntax shown in FIG. 2C, such instruction could be written as:

BITRAKE.[SP]A.1D.[UXZ]Rte, Rxe, Rye

Further variations could also be generalized to dual 32-bit as well as other data types.

The present invention includes techniques which segments the implementation of a bit rake instruction into multiple simpler problems which are more easily solved. The segmentation technique includes both temporal and spatial aspects. Multiple successive stages are employed with each stage building on the previous stage's result. Information flows through the stages temporally. Information at each stage is partitioned into multiple independent information groups, thereby improving operation concurrency spatially. As information advances through the stages, the number of independent information groups decreases while the size of each group increases. As the group size increases, so does the regularity of the information within, allowing increasingly efficient data movement at each successive stage.

Figure 3A:
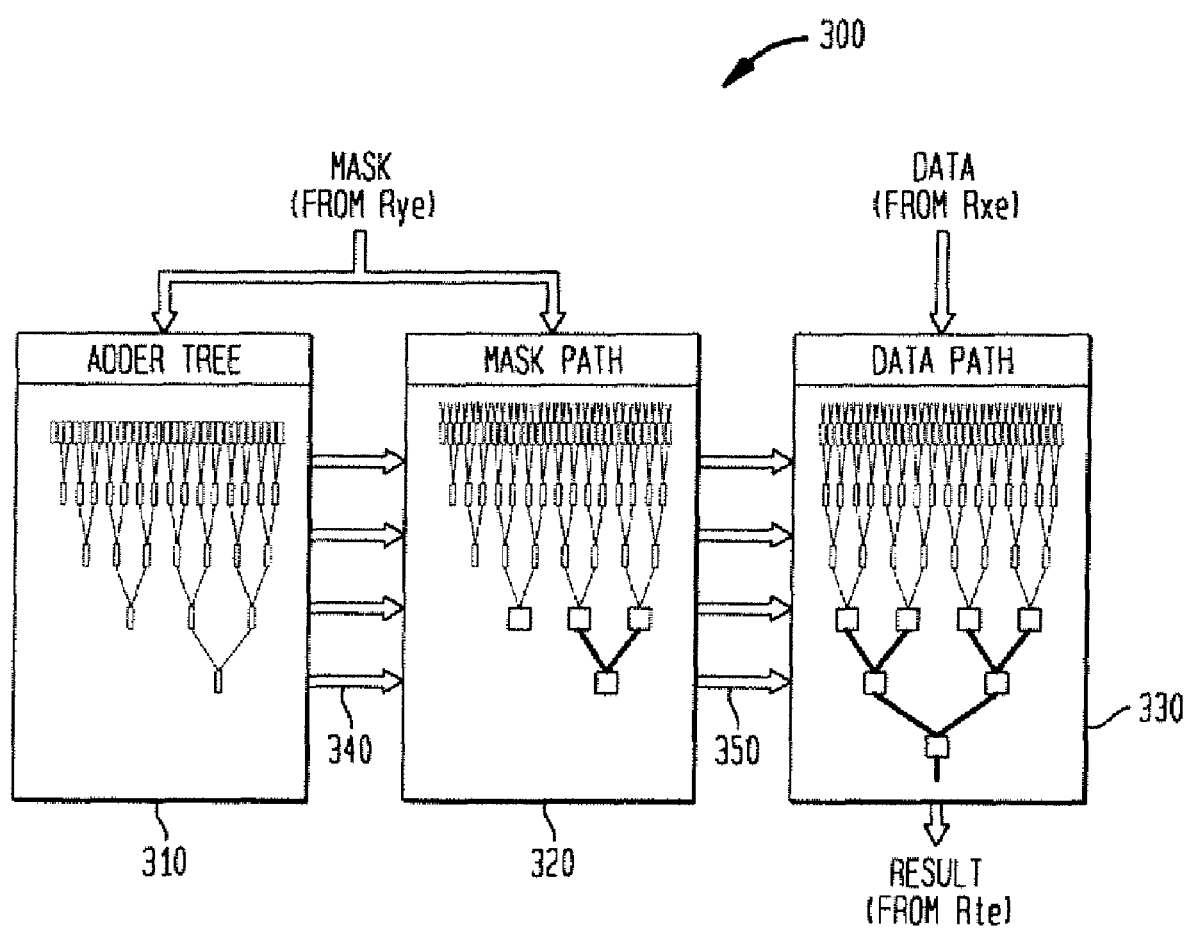

FIG. 3A shows a block diagram of a bit rake apparatus 300 in accordance with the present invention. As seen in FIG. 3A, the present invention may suitably include three primary functional blocks: an adder tree block 310, a mask path block 320 and a data path block 330, each comprising a plurality of stages. The adder tree 310 computes the sum of the number of mask bits in each of the groups for all power-of-two group sizes. The adder tree block 310 comprises a plurality of adder stages, with each adder's sum and carry output providing control to the corresponding mask path block 320 and data path block 330. The mask path block 320 provides individual group masks at each stage for use in controlling the selection of data in the data path block 330.

As described in greater detail below, data and mask movement in the mask path block 320 and data path block 330 utilizes a binary shifter followed by a multiplexer. The depth of the binary shifter increases by one multiplexer level with each stage advance. Shifting amounts and group sizes are restricted to powers-of-two to maintain minimal propagation delays through shifters, and yield the most efficient adder sizing.

Propagation delays through the three primary functional blocks 310, 320 and 330 and their inter-block controls 340 and 350 are preferably balanced. Results at each stage in all three blocks proceed through their paths in unison. Depending upon the implementation and technology process, the adder stage may include a slightly longer or shorter delay. Balancing the propagation delay aids in minimizing the overall critical timing path propagation delay.

FIG. 3B shows a detailed view of the bit rake apparatus 300. As seen in FIG. 3B and described in greater detail below, the data path block 330 is controlled by the adder tree 310 and the mask path block 320. The numbers in the adder boxes in the bit adder tree 310 refer to the maximum value of the sum of the inputs. Consequently, the output of each adder block has a maximum value which is a power of two. The mask path block 320 is controlled by the adder tree block 310. It is noted that depending upon the implementation and circuit technology chosen, the first several levels of the adder tree block 310, mask path block 320 and data path 330 may undergo logic reduction to result in a more efficient gate usage and minimal delay, yet maintain the same functionality.

The following provides an example describing the data movement through the stages in a right-shifting fashion, showing how data moves from a programmer's perspective. Next, it is shown that by reorienting portions of the information, left shifting, and using the normally occurring carry outputs from the adder tree, a more efficient data movement mechanism, with reduced size and delay, is produced. After the basic extraction mechanism is described for extracting all of the masked data, a description is given for how to also generate the extraction of the unmasked bits.

FIG. 4 includes an exemplary diagram 400 showing how a 64-bit result may be obtained by successively sorting groups of asserted mask bits, such as mask bits contained in register Rye, in increasing powers-of-two sizes, starting with smaller groups, and progressively increasing the group size through an input 402 and a series of stages 404, 406, 408, 410, 412 and 414. This technique may be suitably applied to the data values contained in register Rxe. As seen in FIG. 4, at each level or stage, sorting involves multiple independent bit groups of similar size. The extraction technique combines each pair of adjacent bit groups by realigning the left group into the right group using a binary shifter. These combinations, from stage to stage, create continually larger groups of contiguous asserted mask bits. Combining groups effectively squeezes out the embedded "0"s, the unasserted mask bits, and repositions the left group's "1"s adjacent to the right group's "1"s. Some of the right group's "0" bits may be discarded. Any left group "0" bits are retained as shifted, since the left group is repositioned in toto. However, the left group "0" bits too will eventually be discarded in subsequent stages. Any right group "1" bits are retained in their current position.

By sorting in powers-of-two as shown in FIG. 4, a binary shifter of increasing size can be used at each level to provide an efficient realignment of bits, with little control logic cost or delay. In the present context, a binary shifter may include a shifter with only power-of-two shift amounts, and shifts in only one direction. Input 402 shows a field of 64 bits. The "1"s represent asserted mask bits. Data movement from input 402 to stage 404 involves combining the 64 bits into 32 groups containing 2 bits each. Each adjacent pair of bits is combined into a 2-bit group by moving the "1" bits to the right. For example "00" becomes "00", "01" becomes "01", "10" becomes "01", and "11" becomes "11". Two mask bit movements occur in the transition from input 402 to stage 404.

Stage 404 shows 32 groups of 2-bit fields. Data movement from stage 404 to stage 406 involves utilizing sixteen adjacent pairs of 2-bit groups. In each of these sixteen group pairs, using the number of unasserted mask bits in the right group of each pair, the left group is shifted that amount to the right. As an example in stage 404, bits 404a have one "0" in the right group causing the left group of 2 bits to shift right 1 position. The "1" bit in the right group is retained, and becomes the rightmost bit in the resulting group of 4 bits (0011). The middle 2 bits (01) are from the shifted left group, and the remaining, leftmost bit is "0" filled by the mechanism.

Stage 406 shows 16 groups of 4-bit fields. Data movement from stage 406 to stage 408 involves utilizing 8 adjacent pairs of 4-bit groups. In each of these 8 pairs in stage 406, the left group is shifted to the right by the number of unasserted mask bits in the right group. Any "1" bits in the right group are retained, and zeros are filled on the left according to the shift amount. As an example in stage 406, bits 406a are right group of bits in which all 4 bits are asserted (1111). Since all of the bits are asserted, in moving from stage 406 to stage 408, the left group of bits (0001) is not shifted (shifted amount equals zero) and combined with the right group to form 00011111. Bits 406b are a right group of bits in which all 4 bits are unasserted (0000). Since all of the bits are unasserted, in moving from stage 406 to stage 408, the left group of bits (0001) is shifted 4 positions and combined with the right group to form 00000001.

Stage 408 shows 8 groups of 8-bit fields. Data movement from stage 408 to stage 410 involves 4 adjacent pairs of 8-bit groups. In each of these 4 pairs in stage 408, the left group is shifted to the right by the number of unasserted mask bits in the right group. Any "1" bits in the right group are retained, and zeros are filled on the left according to the shift amount.

Stage 410 shows 4 groups of 16-bit fields. Data movement from stage 410 to stage 412 involves 2 adjacent pairs of 16-bit groups. In each of these 2 pairs in stage 410, the left group is shifted to the right by the number of unasserted mask bits in the right group. Any "1" bits in the right group are retained, and zeros are filled on the left according to the shift amount.

Stage 412 shows 2 groups of 32-bit fields. Data movement from stage 412 to stage 414 involves both 32-bit groups. The left group is shifted to the right by the number of unasserted mask bits in the right group. Any "1" bits in the right group are retained, and zeros are filled on the left according to the shift amount.

In the example shown in FIG. 4, the number of unasserted mask bits was computed and used to determine the amount to shift right. However, in an alternate embodiment of the present invention, a functionally equivalent alternative technique is utilized to count the number of asserted mask bits and left-shift a repositioned left group. This technique is described in further detail below and shown in FIG. 5 which shows a diagram 500 of an exemplary right-shift to left-shift in accordance with the present invention. A pair of 4-bit groups 502 and 504 is shown generically as ABCD and WXYZ, respectively. Five cases 506, 508, 510, 512 and 514 that occur for the legal combinations of WXYZ are indicated in the left column utilizing the nomenclature WXYZ=xxxx. The shift right (SHR) column 516 and shift left (SHL) column 518 border the result column 520 containing 8-bit data patterns for each case. The SHR column 516 shows how the left group is shifted to the right and "0"-filled to the left by an amount equal to the number of "0" bits in the right group. The shifted left group 502 is then merged with the "1" bits in the right group 504. The SHL column 518 describes how the left group 502 is repositioned 4 bits to the right, aligning it exactly with the right group 504, and then shifted to the left by an amount equal to the number of "1" bits in the right group 504. As described above, the shifted left group 502 is merged with the "1" bits in the right group, and zero-filled to the left as required.

Figure 9A:
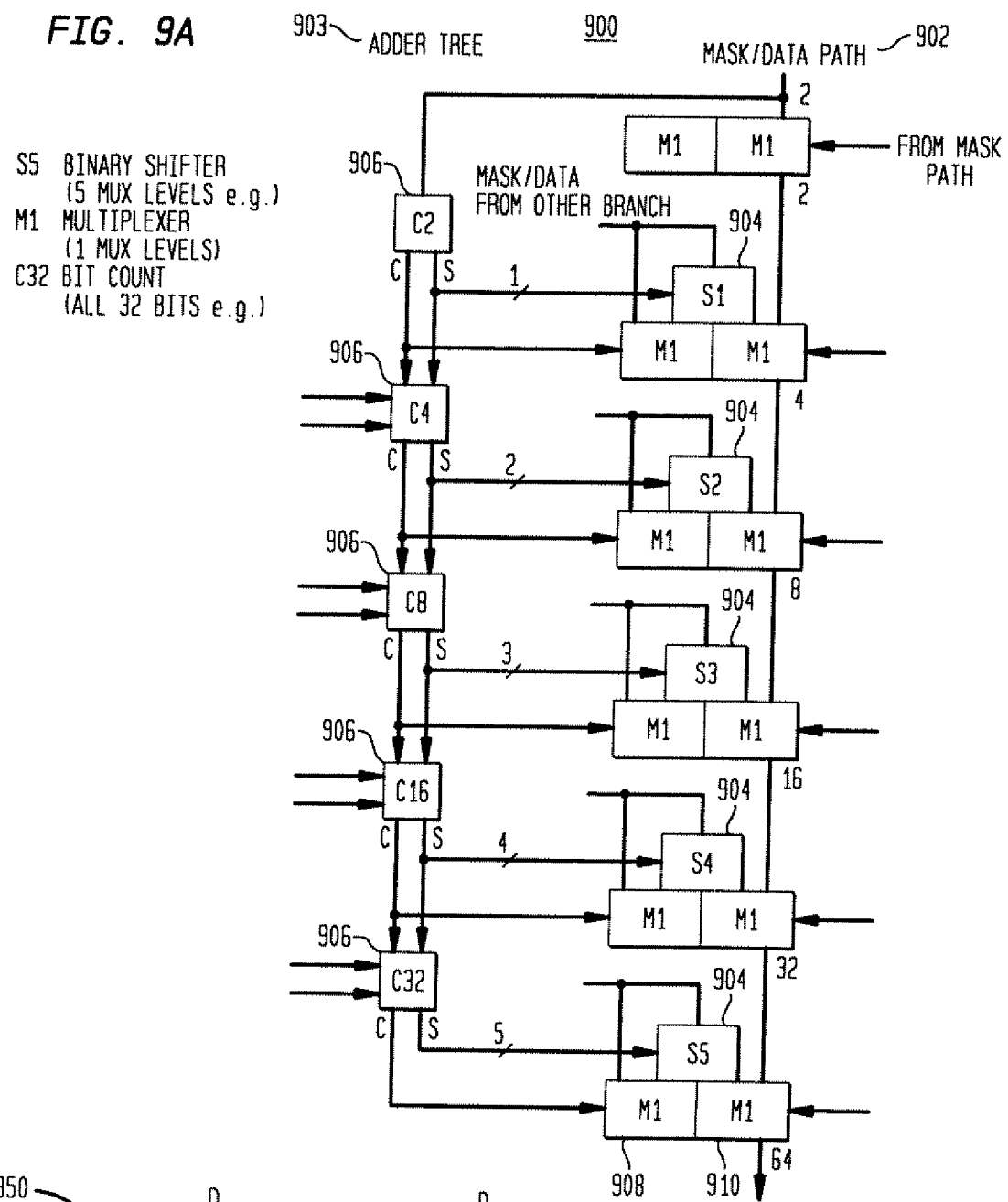
FIG. 9A shows a data path structure in accordance with the present invention.
Figure 9B:
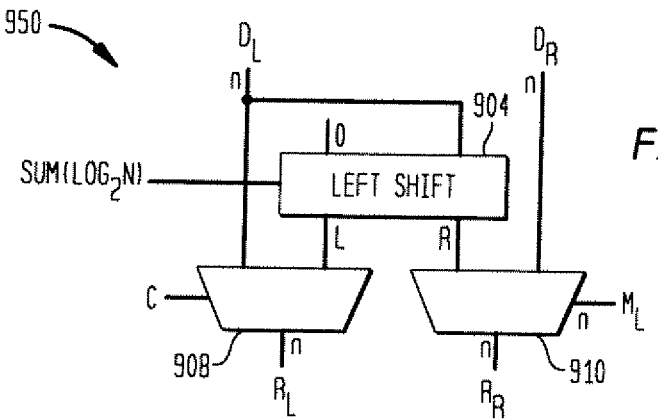
FIG. 9B shows a shifter and multiplexer stage in accordance with the present invention.

To obtain the results shown in the results column 520, the right group requires a binary shifter followed by 2:1 multiplexer to perform the merge with the "1" bits, while the left group requires only the binary shifter output. Therefore, the left group can tolerate an additional multiplexer delay without increasing overall stage delay. Further details are shown in FIGS. 9A and 9B and described in greater detail below. Using this additional left-group multiplexer under control of the adder carry bit to accomplish the SHL4 data movement, a left shifter with only 2 levels of multiplexer delay (SHL=00, 01, 10, 11) instead of 3 may be utilized. Shifting left by 4 is not needed, reducing the number of logic levels for binary shifters in each stage.

FIG. 6 shows a left binary shifter 600 in accordance with the present invention, where the blocks, for example block 610, are two-to-one multiplexers. Unlike the previous discussion where only a 2-bit left shifter was required, this shifter is used in the next successive stage where each 8-bit field is left shifted from 0 to 7 positions. In other words, the example shown in FIG. 5 corresponds to the transition from stage 406 to stage 408 in FIG. 4, and the binary shifter 600 of FIG. 6 corresponds to the transition from stage 408 to stage 410 in FIG. 4. The $S_2$, $S_1$ and $S_0$ inputs, which control the shift amount, are provided from an appropriate adder tree sum output.

Figure 7:
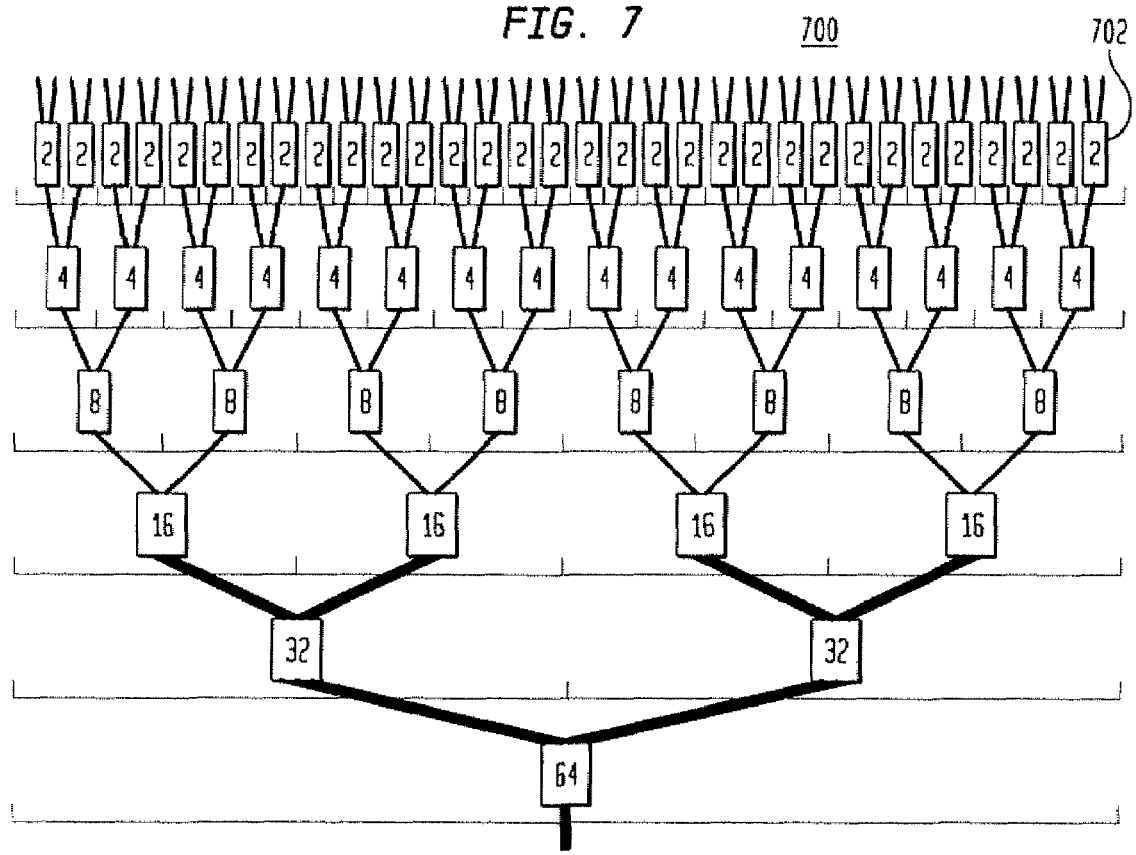
FIG. 7 shows a data path diagram in accordance with the present invention.

The mask extraction mechanism described above for asserted mask bits from Rye may be applied similarly to the data bits from Rxe. FIG. 7 shows a data path tree diagram 700, superimposed over the data fields, in accordance with the present invention. Each numbered box 702 of FIG. 7 represents the logic to shift and align data. For clarity of illustration, only a single box is associated with an element number. The shift amount and mask bits control the data path at each stage. The mask path directly determines which data bits are to be used. In contrast to the mask path, where the mask bits were retained in the right most pair of groups, for the data path the rightmost data bits retain their previous stage's data value when their corresponding mask bits are asserted, and merge the left group's shifted data based upon the corresponding shift amount, as described in greater detail below with respect to FIGS. 9A and 9B.

Figure 8:
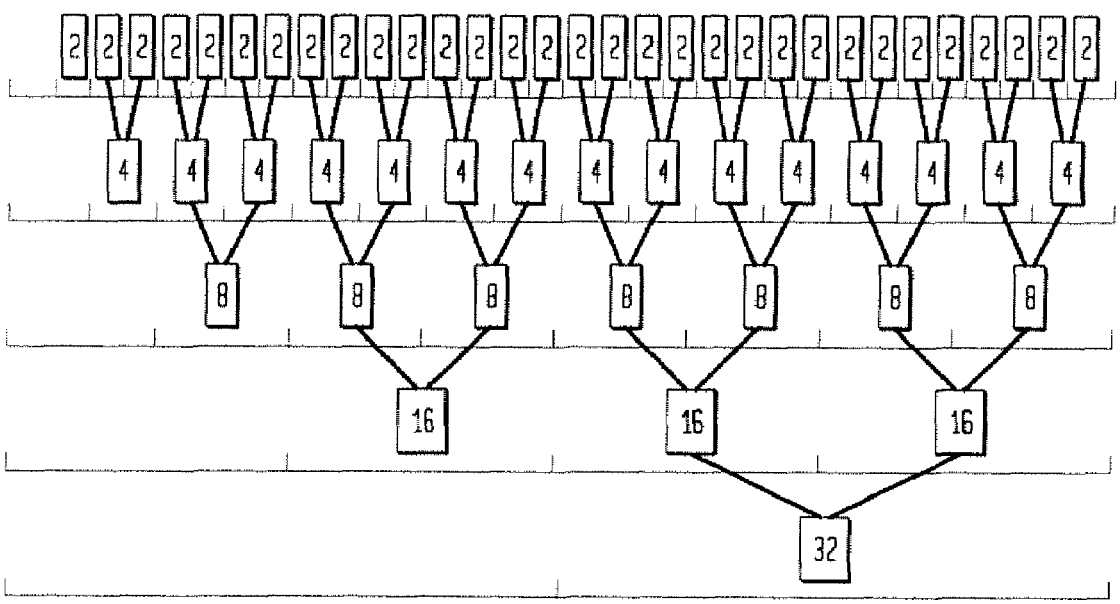
FIG. 8 shows an adder tree in accordance with the present invention.

The binary shift amounts controlling the mask path and data path are generated from the Rye source. An adder tree 800, shown in FIG. 8 superimposed over the data fields, computes successive sums of bits on a power-of-two basis from 2-bit groups up to the larger 32-bit group for the adder tree functional block. In FIG. 8, each box labeled as 2 designates an addition of 2 1-bit numbers, and has an output range from 0 to 2. Each box labeled as 4 designates an addition of 2 2-bit numbers, and has an output range from 0 to 4. Each box labeled as 8 designates an addition of 2 3-bit numbers, and has an output range from 0 to 8. Each box labeled as 16 designates an addition of 2 4-bit numbers, and has an output range from 0 to 16. Each box labeled as 32 designates an addition of 2 5-bit numbers, and has an output range from 0 to 32. Most of the intermediate sums as well as the final sum are utilized to provide controlling data at each stage, as seen in FIG. 3B and indicated by lines 312.

FIG. 9A shows a dual path structure 900 representing typical control and data flow through the tree of the mask path and the data path. A rightmost data path or mask path branch 902 is shown with a corresponding adder tree branch 903. Binary shifters 904 are designated S1, S2, S3, S4 and S55, with the numeral suffixes referring to both the stage and the number of levels of multiplexer employed. The binary shifters 904 receive data inputs from the left bit group, shown as "mask/data from other branch." The binary shifters 904 receive control inputs from the adder result at the appropriate level of the tree, shown as the "s" (sum) output from adder blocks 906. Each adder block 906 is designated as C2, C4, C8, C16 and C32, with the numeral suffixes referring to the number of bit positions summed from the source mask for each bit group.

A plurality of single-level multiplexers (M1) 908 and 910 are fed by the binary shifters 904 and the previous stage data. The leftmost M1 908 refers to the leftmost bit group while the rightmost M1 910 refers to the rightmost bit group at each stage. The leftmost M1 908 is collectively controlled by the adder carry bit, and selects either the unshifted data bits when carry is asserted, or the shifted data bits when carry is unasserted. Optimal timing for the carry path is obtained by using an adder design where the carry out is no slower than the next most significant bit. Each bit of the rightmost M1 910 is individually controlled by each of the corresponding mask bits. The unshifted previous stage data bits are selected where mask bits are asserted and the left-shifted data bits are selected where mask bits are unasserted.

FIG. 9B shows a detailed view of a shifter and multiplexer stage 950 suitable for use with data path structure 900. "L" refers to leftmost bit group and "R" refers to rightmost bit group, with "n"=2, 4, 8, 16, 32, as shown in FIG. 9A.

For the zero-fill version (.Z) of the bit rake instruction, each asserted extracted mask bit is used to generate the final result by selecting either its data path values or logical zero. For the most significant extracted bit (MSEB) version (.X) of this instruction, each asserted extracted mask bit is used to generate the final result by selecting either its datapath value or the MSEB. The MSEB value is easily determined from the input values by finding the first asserted mask bit and selecting the data value, and can be done in parallel with the successive bit shifting mechanism.

Figure 10:
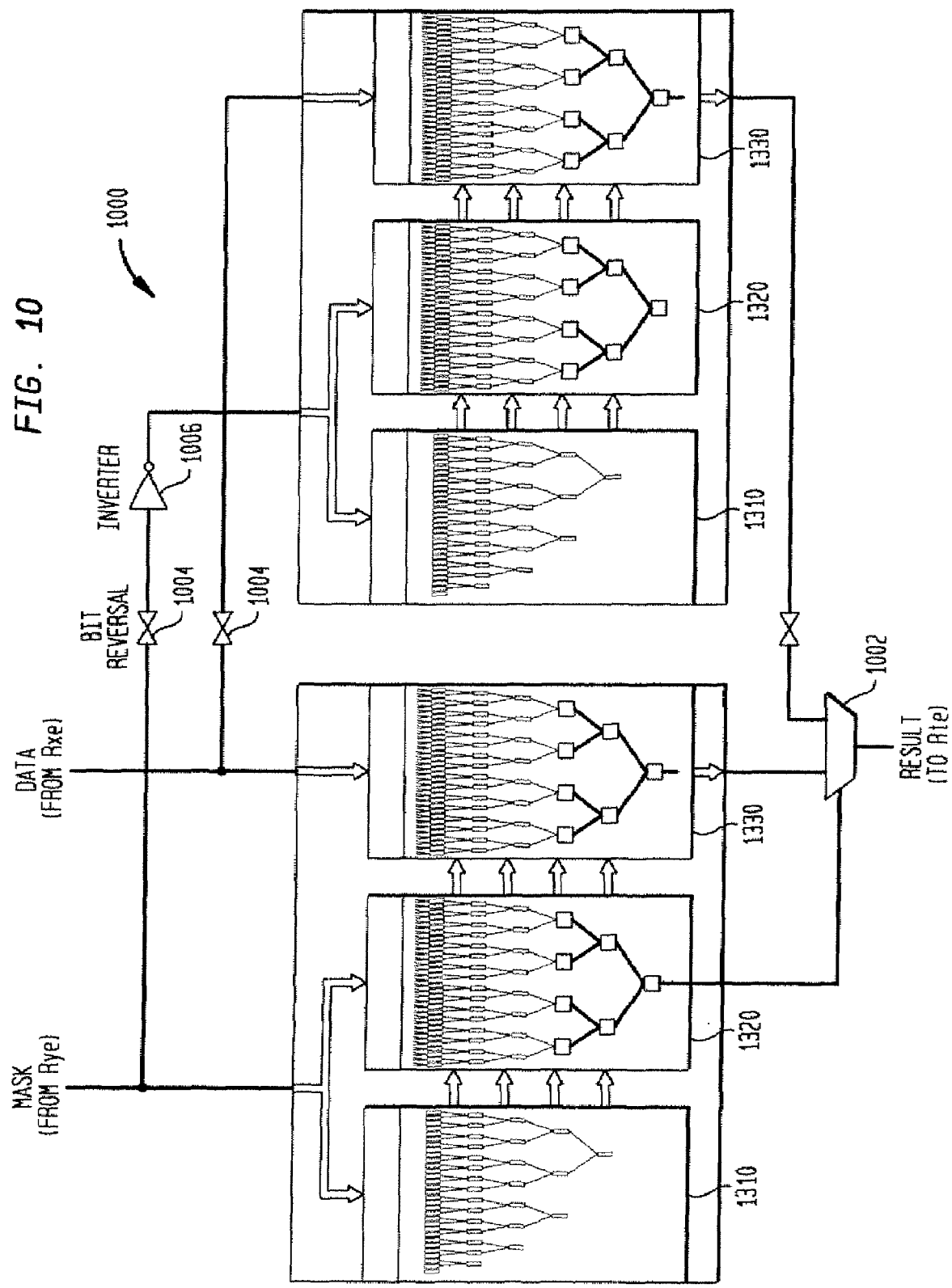
FIG. 10 shows a diagram of a bit rake instruction apparatus in accordance with the present.

For the version of this instruction (.U), which also sorts the unmasked bits, each asserted extracted mask bit is used to generate the final result by selecting either its datapath value or the inverse result value. FIG. 10 shows a block diagram of circuitry 1000 suitable for performing a (.U) version of the bit rake instruction comprising an adder tree blocks 1310, mask path blocks 1320 and data path blocks 1330. Inverse results are computed in parallel with this mechanism by bit reversing the source mask and data values, as well as logically inverting the source mask value, then using an identical mechanism that produces "raked" unmasked data values, which can be used in the final selection multiplexers 1002. The inverse source and data values are provided through bit reversers 1004 and an inverter 1006. Inclusion of logic to implement the U instruction form doubles the physical size of the circuitry, but has negligible delay increase.

Figure 11:
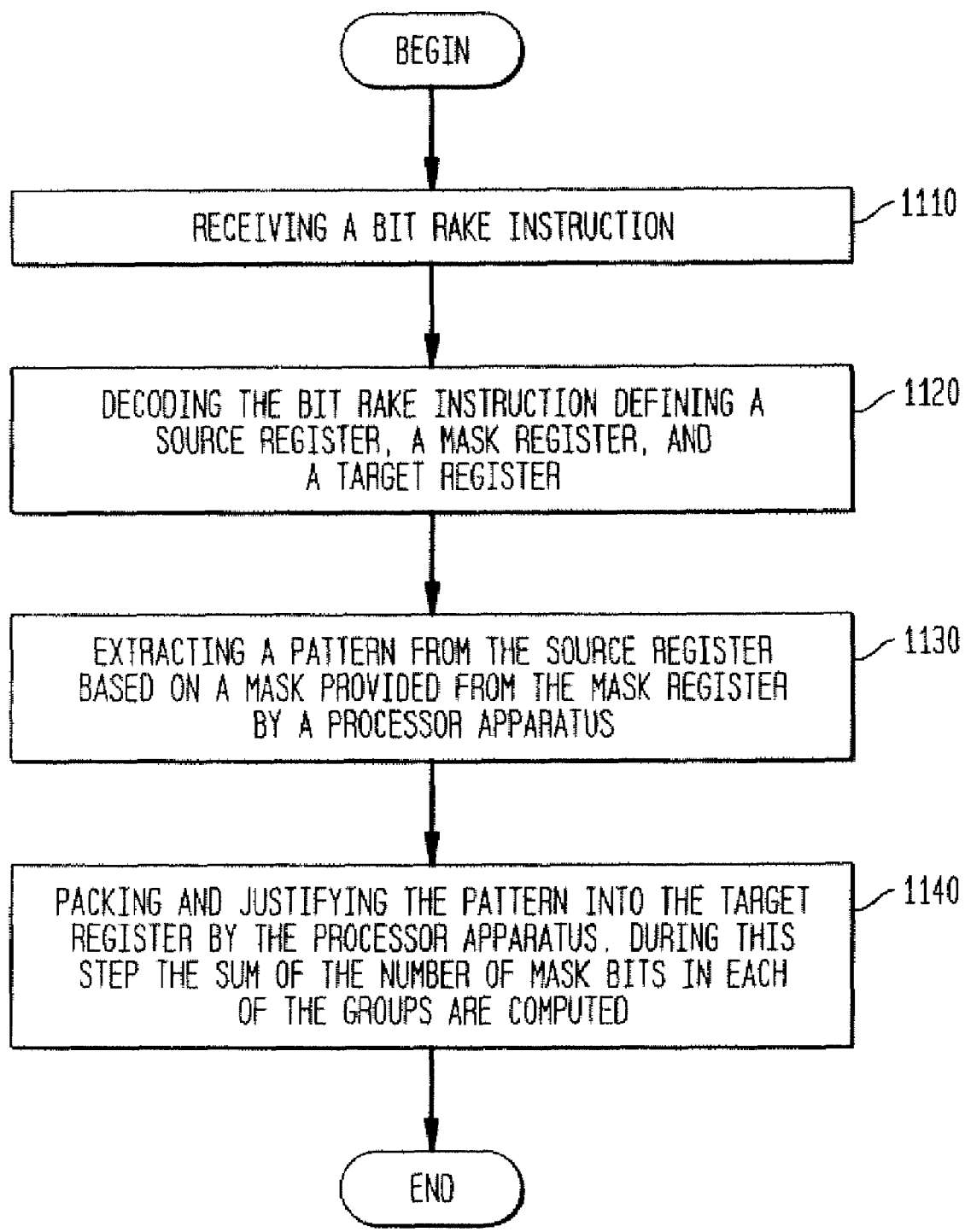
FIG. 11 is a flow chart illustrating a method for executing a bit rake instruction.

FIG. 11 is a flow chart illustrating a method 1100 for executing a bit rake instruction, such as the one shown in FIG. 2A. The method comprises four main steps. At step 1110, the bit rake instruction is received. At step 1120, the bit rake instruction defining a source register, a mask register, and a target register is decoded. At step 1130, a pattern is extracted from the source register based on a mask provided from the mask register by a processor apparatus. At step 1140, the pattern is packed and justified into the target register by the processor apparatus. The processor apparatus may suitably comprise an adder tree 310, a mask path 320, and a data path 330 wherein the adder tree 310, a mask path 320, and a data path 330 each comprise a plurality of stages as shown in FIGS. 3A and 3B. The mask comprises a number of groups of bits, each group size being a power of two. The method 1100 may additionally compute the sum of the number of mask bits in each of the groups. To do so, the plurality of stages of the adder tree comprises adders as shown in FIG. 9A, for example. As shown in FIG. 9A, each of the stage's adders includes a sum output and a carry output. The method 1110 may additionally control the corresponding mask path and data path stage groups as shown in FIG. 9A by utilizing the sum output and the carry output. As shown in FIG. 3A, the mask path block 330 provides group masks at each stage of the mask path for controlling selection of corresponding group data in the data path. As shown in FIG. 9A, the mask path stages and the data path stages may suitably comprise a binary shifter and at least one multiplexer with the depth of the binary shifter increasing by one multiplexer with each stage advance. As discussed above in connection with FIG. 3A, the shifting amounts and group sizes may be restricted to powers of two. The output of each adder may have a maximum value which is a power of two. The method 1100 may additionally control the at least one multiplexer utilizing an adder carry bit as described in connection with the discussion of FIG. 9A above. The method 110 may alternatively pack the pattern into the least significant bit position of the target register as described in connection with the discussion of FIG. 2B above. The method 1100 may alternatively fill the unextracted bit positions in the target register with a replication of the most significant extracted as described in connection with the discussion of FIG. 9A. The most significant extracted bit value is determined from the input values by determining a first asserted mask bit and selecting the corresponding data value as shown in FIG. 2B. The unextracted bit positions in the target register are filled by sorted unmasked bits as shown in FIG. 2B.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

We claim:

1. An apparatus for extracting a pattern of data bits and packing the extracted pattern of data bits in a right justified format, the apparatus comprising:
   a data register;
   a target register;
   an adder tree for computing a plurality of count values of a number of asserted mask bits in non-overlapping groups of mask bits within stages of the adder tree;
   a mask path for combining pairs of adjacent groups of mask bits within stages of the mask path corresponding to the stages of the adder tree by utilizing the plurality of count values within corresponding stages of the mask path to realign within the pairs of adjacent groups of mask bits a left group of mask bits with an adjacent right group of mask bits and to merge the realigned left group of mask bits with the adjacent right group of mask bits to provide a plurality of mask values; and
   a data path for combining pairs of adjacent groups of data bits within stages of the data path corresponding to the stages of the adder tree and corresponding to stages of the mask path by utilizing the plurality of count values within corresponding stages of the data path to realign within the pairs of adjacent groups of data bits a left group of data bits with an adjacent right group of data bits and to merge the realigned left group of data bits with the adjacent right group of data bits by utilizing the plurality of mask values within corresponding stages of the data path, wherein the pattern of data bits is extracted from the data register and the extracted pattern of data bits is packed in a right justified format in the target register.

2. The apparatus of claim 1 wherein a mask value retains asserted mask bits from the adjacent right group of mask bits and mask bits from the left group of mask bits in place of unasserted mask bits from the adjacent right group of mask bits.

3. The apparatus of claim 1 wherein the realigned left group of data bits is merged with the adjacent right group of data bits by selecting data bits of the adjacent right group of data bits that correspond to asserted mask bits of a corresponding mask value and selecting data bits of the left group of data bits that correspond to unasserted mask bits of the corresponding mask value.

4. The apparatus of claim 1 wherein the adder tree has $\log_2(N)-1$ stages for N-bit data, wherein the adder tree receives an N-bit mask as input to stage one of the adder tree and each succeeding stage of the adder tree receives only outputs of a preceding adder tree stage.

5. The apparatus of claim 1 wherein each stage of the adder tree computes count values of the number of asserted mask bits in non-overlapping groups of mask bits, wherein the non-over-lapping groups of mask bits have a size that is a power of two of an adder tree stage number.

6. The apparatus of claim 5 wherein the size of the non-overlapping groups of mask bits for stage one of the adder tree is groups of two mask bits and the size of the non-overlapping groups of mask bits for stage two of the adder tree is groups of four mask bits.

7. The apparatus of claim 1 further comprises:
shifter circuits within stages of the mask path, wherein one of the plurality of count values associated with a particular group of mask bits within a stage of the adder tree causes the left group of mask bits to be realigned with the adjacent right group of mask bits within a shifter circuit in a stage of the mask path that corresponds to the stage of the adder tree.

8. The apparatus of claim 1 further comprises:
shifter circuits within stages of the data path, wherein one of the plurality of count values associated with a particular group of mask bits within a stage of the adder tree causes the left group of data bits to be realigned with the adjacent right group of data bits within a shifter circuit in a stage of the data path that corresponds to the stage of the adder tree.

9. The apparatus of claim 1 wherein each count value includes a summation value for controlling realignment of left groups of mask bits with the adjacent right groups of mask bits and realignment of left groups of data bits with the adjacent right groups of data bits and a carry value for controlling in part merging of the realigned left group of mask bits with the adjacent right group of mask bits and in part merging of the realigned left group of data bits with the adjacent right group of data bits.

10. The apparatus of claim 1 further comprises:
a mask register for holding an N-bit mask having asserted bits which identifies the pattern of data bits to be extracted from the data register, wherein
the data register holds N-bits of data from which the pattern of data bits is extracted and
the target register holds an N-bit extracted pattern of data bits that is packed in the right justified format.

11. The apparatus of claim 1 further comprises:
an instruction register for receiving a bit rake instruction which identifies the data register as a register from a register file, a mask register as another register from the register file, the target register as another register from the register file and specifies an operation for extracting a pattern of data bits and packing the extracted pattern of data bits in a right justified format.

12. A method for extracting a pattern of data bits and packing the extracted pattern of data bits in a right justified format, the method comprising:
computing a plurality of count values of a number of asserted mask bits in non-overlapping groups of mask bits within stages of an adder tree;
combining pairs of adjacent groups of mask bits within stages of a mask path corresponding to the stages of the adder tree by utilizing the plurality of count values within corresponding stages of the mask path to realign within the pairs of adjacent groups of mask bits a left group of mask bits with an adjacent right group of mask bits;
merging within the stages of the mask path the realigned left groups of mask bits with the adjacent right groups of mask bits to provide a plurality of mask values;
combining pairs of adjacent groups of data bits within stages of a data path corresponding to the stages of the adder tree by utilizing the plurality of count values within corresponding stages of the data path to realign within the pairs of adjacent groups of data bits a left group of data bits with an adjacent right group of data bits; and
merging within the stages of the data path the realigned left groups of data bits with the adjacent right groups of data bits by utilizing the plurality of mask values within corresponding to stages of the data path to extract a pattern of data bits from a data register and pack the extracted pattern of data bits in a right justified format in a target register.

13. The method of claim 12 wherein a mask value retains asserted mask bits from the adjacent right group of mask bits and mask bits from the left group of mask bits in place of unasserted mask bits from the adjacent right group of mask bits.

14. The method of claim 12 wherein the merging within the stages of the data path comprises:
selecting data bits of the adjacent right groups of data bits corresponding to asserted mask bits of a corresponding mask value; and
selecting data bits of the left groups of data bits corresponding to unasserted mask bits of the corresponding mask value.

15. The method of claim 12 further comprising:
receiving in the adder tree having $\log_2(N)-1$ stages for N-bit data an N-bit mask as input to stage one of the adder tree; and
receiving in each succeeding stage of the adder tree only outputs of a preceding adder tree stage.

16. The method of claim 12 wherein computing the plurality of count values comprises:
computing in each stage of the adder tree count values of the number of asserted mask bits in non-overlapping groups of mask bits, wherein the non-overlapping groups of mask bits have a size that is a power of two of an adder tree stage number.

17. The method of claim 12 wherein the combining pairs of adjacent groups of mask bits comprises:
shifting by a shift amount to realign the left group of mask bits with the adjacent right group of mask bits, wherein a count value of the plurality of count values associated with a particular group of mask bits within a stage of the adder tree controls the shift amount.

18. The method of claim 12 further comprises:
receiving a bit rake instruction in an instruction register, wherein the bit rake instruction identifies the data register from which the pattern of data bits is extracted, a mask register which holds a mask having asserted bits which identifies the pattern of data bits to be extracted from the data register, the target register to hold the extracted pattern of data bits that is packed in the right justified format, and specifies an operation for extracting a pattern of data bits and packing the extracted pattern of data bits in the right justified format.

19. An apparatus for extracting a pattern of data bits from N-bit data based on an N-bit mask and packing the extracted pattern of data bits in a right justified format to generate an N-bit result, the apparatus comprising:
a data register;
a target register;

an adder tree for computing in stages a plurality of count values of asserted mask bits in non-overlapping groups of mask bits, wherein an adder tree stage one provides a stage one count of asserted mask bits in groups of two non-overlapping mask bits, an adder tree stage two provides a stage two count of asserted mask bits in groups of four non-overlapping mask bits, continuing up to and including an adder tree stage $\log_2(N)-1$ that provides a stage $\log_2(N)-1$ count of asserted mask bits in groups of N/2 non-overlapping mask bits;

a mask path having stages connected in successive groups of increasing power of two group sizes for sorting the N-bit mask in corresponding successive groups of mask bits, wherein the stage one count controls producing a mask path stage one result, the stage two count controls producing a mask path stage two result, continuing up to and including a stage $\log_2(N)-1$ count controls producing a mask path $\log_2(N)-1$ stage result; and a data path connected in successive groups of increasing power of two group sizes for extracting the pattern of data bits in a data path based on adder tree stage outputs and outputs of the mask path, wherein stages of the adder tree and of the mask path control producing data path results in corresponding stages of the data path wherein the pattern of data bits from N-bit data based on an N-bit mask is extracted from the data register and the extracted pattern of data bits is packed in a right justified format in the target register to generate an N-bit result.

20. The apparatus of claim 19 further comprises:

an instruction register for receiving a bit rake instruction which identifies the data register for holding the N-bit data as a register from a register file, a mask register for holding the N-bit mask as another register from the register file, the target register for holding the N-bit result as another register from the register file and specifies an operation for extracting the pattern of data bits and packing the extracted pattern of data bits in the right justified format.

\* \* \* \* \*